Feb. 23, 1932.   H. KRATZER   1,847,011
VALVE FOR WELLS
Filed Aug. 12, 1931   2 Sheets-Sheet 1
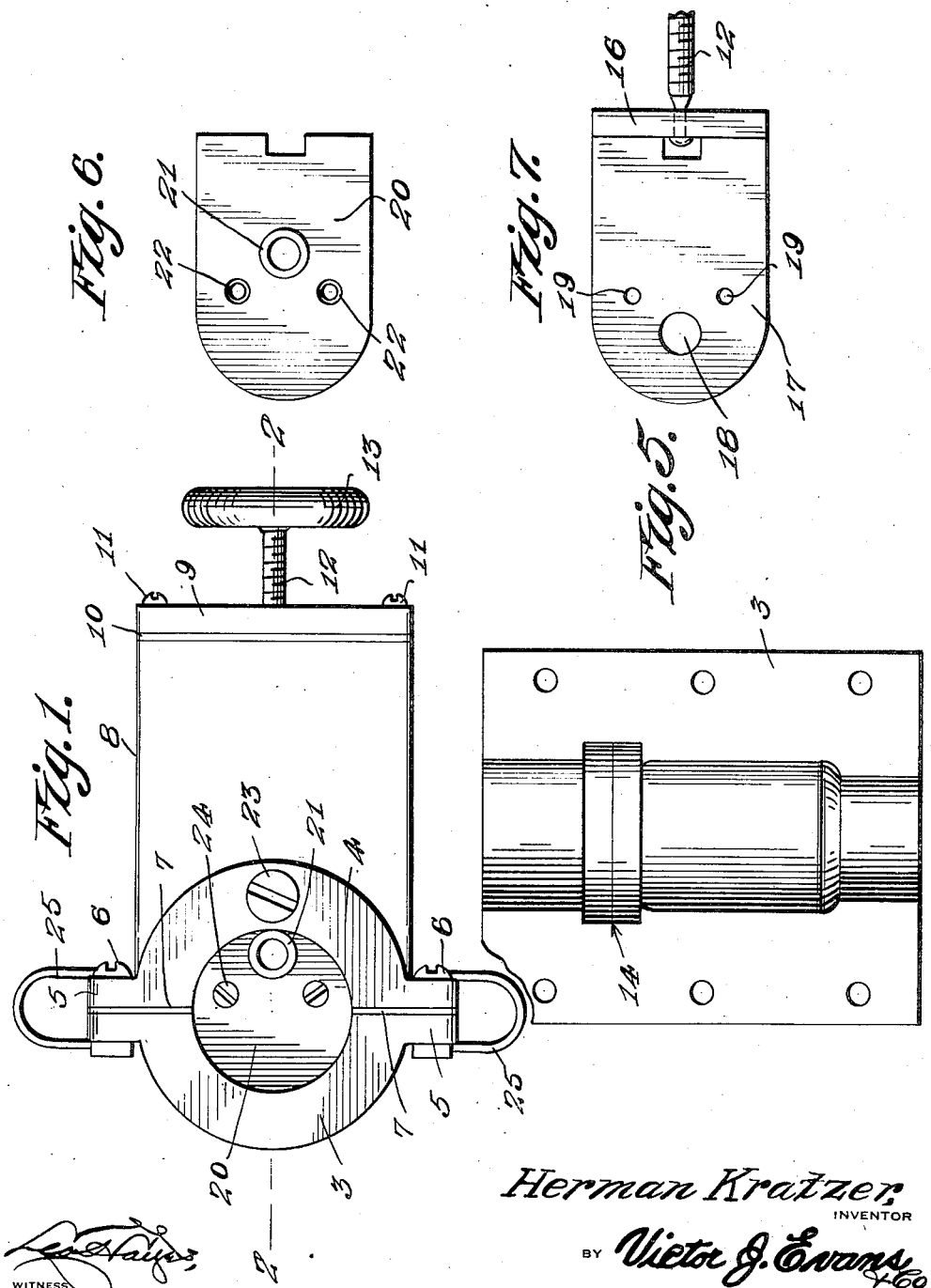
Herman Kratzer,
INVENTOR Feb. 23, 1932.   H. KRATZER   1,847,011
VALVE FOR WELLS
Filed Aug. 12, 1931   2 Sheets-Sheet 2
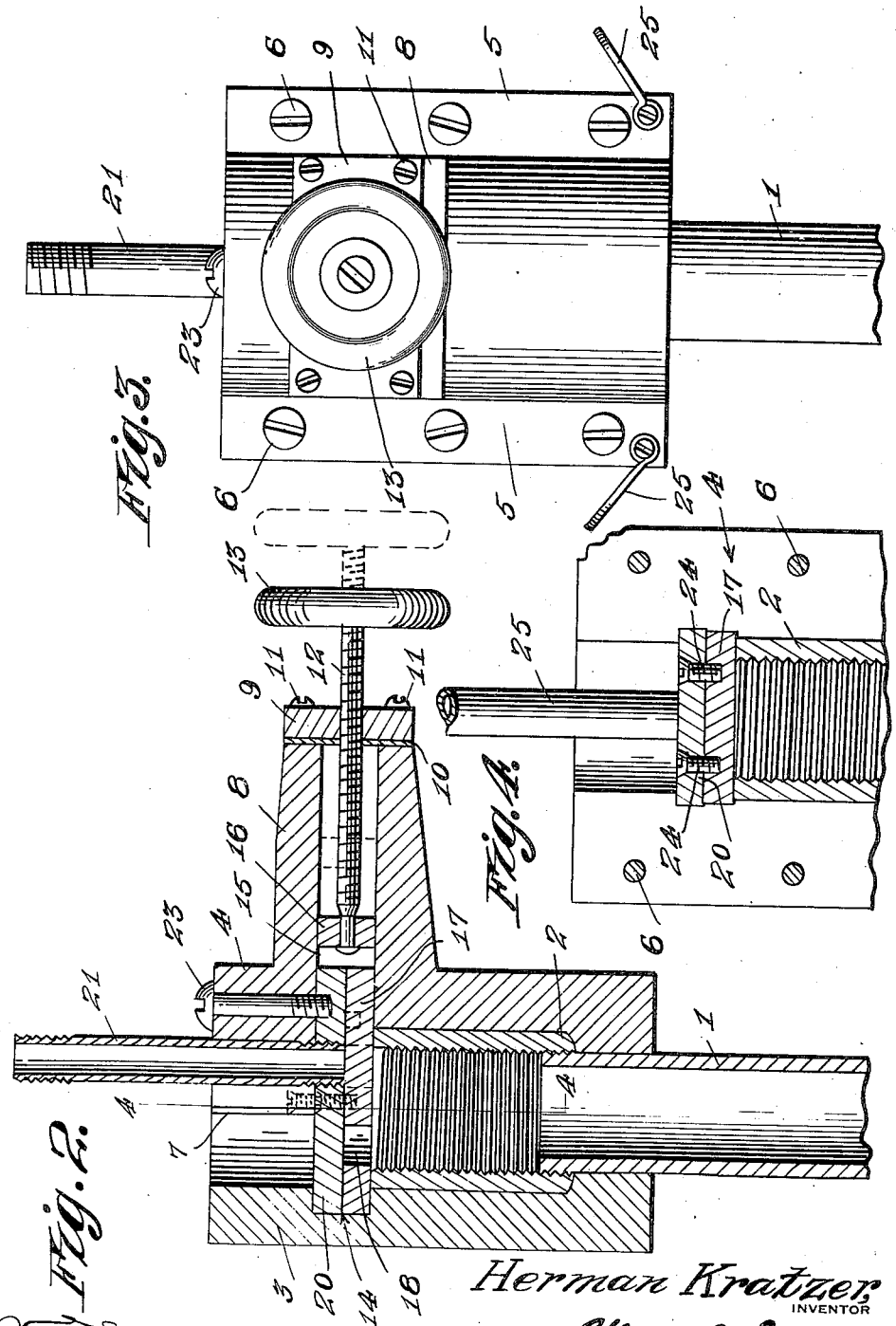

Patented Feb. 23, 1932

1,847,011

UNITED STATES PATENT OFFICE

HERMAN KRATZER, OF KANOPOLIS, KANSAS

VALVE FOR WELLS

Application filed August 12, 1931. Serial No. 556,672.

My present invention has reference to an apparatus used in the drilling of oil wells, particularly to a control head, and the primary object of the invention is the provision of a control head which permits the application and removal of an oil or gas sealing device so that what is commonly termed "wild" oil or gas wells can be controlled which results in the saving of the oil or gas and which will prevent fires which frequently occur in such instances.

To the attainment of the foregoing the invention consists in the improvement hereinafter described and definitely claimed.

In the drawings:

Figure 1 is a top plan view of the improvement.

Figure 2 is a sectional view approximately on the line 2—2 of Figure 1.

Figure 3 is a face view of the improvement.

Figure 4 is a sectional view approximately on the line 4—4 of Figure 2.

Figure 5 is an inner face view of one of the members constituting the improvement.

Figure 6 is a plan view of the stationary plate or valve member.

Figure 7 is a similar view of a movable plate or valve member.

My improved device is constructed in sections so that the same can be easily and quickly clamped around a well casing 1 and the coupling 2 on the upper end thereof. The device is, of course, designed for use above ground and the same can be arranged on one of the casing sections without interfering with the drilling operation when the valve plates are removed from the body of the improvement. The body of the improvement comprises two semi-cylindrical sections or parts 3 and 4, respectively. The confronting faces of these sections have outstanding flanges 5 provided with spaced alining openings for the reception of bolts 6 which are engaged by nuts. Between the confronting faces of the sections 3 and 4, outward of the cylindrical bore therethrough, there are packing strips 7. The upper portion of the bore of the body is widened to receive the coupling 2 therein, the lower portion of the bore being more restricted to snugly receive the casing 1 therethrough. When the sections 3 and 4 are clamped together by the screws 6 the compressible strips 7 will establish a tight joint between the improvement and the casing 1 and its coupling 2. The section 4 is provided with a rectangular or nose extension 8 adjacent to its top and the outer end of the nose portion 8 is closed by a plate 9 that compresses against the nose a gasket 10 when the securing bolts 11 for the plate 9 are screwed home and into threaded openings provided therefor in the nose 8. The head plate 9 has a central threaded opening therethrough for a screw 12 whose outer end is provided with an operating wheel 13. The screw is received in the bore of the nose and the sections 3 and 4 that comprise the body of the improvement have an interior groove or slot 14 whose upper and lower walls are arranged in a line with those of the hollow portion 15 of the nose 8. The screw 12 has its inner end swivelly secured to an upstanding flange 16 on a slidable valve plate 17. The plate 17, adjacent its outer and rounded end is provided with a round opening 18 and to the opposite sides of the said opening the upper face of the said plate has restricted and threaded openings 19 therethrough. Designed to be arranged over the valve plate 17 there is an upper plate 20 which corresponds in shape to the valve plate. This plate 20, however, is held from movement through the medium of a bolt 23 that is screwed through an opening in the section 4 and enters an opening in the said plate 20. The plate 20 has a round opening therethrough of a size corresponding to that of the through of a size corresponding to that of the opening 18 but the said opening is located a greater distance away from the outer rounded end of the plate 20 than is the opening 18, and there is screwed in this opening a pipe 21. The plate 20 is provided with a pair of spaced openings 22 designed to register with the openings 19 in the valve plate 17 when the valve plate is in one position and these openings are designed to have passed therethrough short bolts 24 which are screwed into the openings 19 in the valve plate 17.

In order to handle the head the lower bolts 6 pass through eyes in bail members 25, the said bail members providing the head with handles. The flow of oil and gas through the well is regulated by the adjustment of the valve plate 17 with respect to the fixed plate 20. By turning the hand operated screw 12 in one direction the valve plate 17 will slide through the groove 14 and into the bore or opening 15 in the nose 8 to bring the opening 18 into register with the opening provided by the outlet pipe 21. The slidable valve plate may be adjusted to regulate the flow of the gas and oil through the opening 18 in the pipe 21. Should the well prove "wild" the screw 12 is turned in an opposite direction to move the valve plate 17 to bring its opening 18 away from the pipe 21 and likewise bring the said valve plate to a position whereby its threaded openings 19 will aline with the openings 22 in the plate 20 and thereafter the screws or bolts 24 are inserted to positively hold the plates associated and prevent the passage of oil or gas through the head. There is, of course, a tight frictional engagement between the valve plate and the plate 20 as well as between these plates and the walls of the groove 14 and the bore 15, with which they contact so that liability of gas or oil passing through the head will be effectively prevented.

It is thought the foregoing description will fully and clearly set forth the advantages and simplicity of my construction to those skilled in the art so that further detailed description will not be required. Obviously I do not wish to be restricted to the specific structure herein shown and described and, therefore, hold myself entitled to make such changes therefrom as fairly fall within the scope of what I claim.

Having described the invention, I claim

1. A control head comprising two members which have semi-cylindrical parts, and have outstanding flanges at their confronting ends, and compressible plates between the said ends, and means for forcing the flanges toward each other for sustaining in the bore a well casing and a coupling therefor, one of said sections having a nose extension which is hollow, a headplate closing the end of the nose, a hand operated screw threaded through the nose and entering the bore, the semi-cylindrical members having a groove alining with the walls of the bore, a slidable plate having an opening therethrough received in the groove and in the bore and having a swivel connection with the screw, a plate received in the groove and bore and resting on the valve plate and removably fixed to the head and having an opening therein normally out of alinement with the opening in the valve plate and in which opening is screwed an outlet pipe.

2. A control head comprising two members which have semi-cylindrical parts, and have outstanding flanges at their confronting ends, and compressible plates between said ends and means for forcing the flanges toward each other for sustaining in the bore a well casing and a coupling therefor, one of said sections having a nose extension which is hollow, a head plate closing the end of the nose, a hand operated screw threaded through the nose and entering the bore, the semi-cylindrical members having a groove alining with the walls of the bore, a slidable plate having an opening therethrough received in the groove and in the bore and having a swivel connection with the screw, a plate received in the groove and bore and resting on the valve plate and removably fixed to the head and having an opening therein normally out of alinement with the opening in the valve plate and in which opening is screwed an outlet pipe, and removable means for locking the plate to the slidable valve plate when the openings in the said plates are out of registering alinement.

In testimony whereof I affix my signature.

HERMAN KRATZER.